United States Patent [19]
Khantzis

[11] Patent Number: 5,745,209
[45] Date of Patent: Apr. 28, 1998

[54] DOUBLE PISTON SPRING HINGE FOR HINGEABLY CONNECTING TEMPLES TO AN EYEGLASS FRAME

[75] Inventor: Carlos A. Khantzis, Woodland Hills, Calif.

[73] Assignee: California Design Studio Inc., Westlake Village, Calif.

[21] Appl. No.: 701,640

[22] Filed: Aug. 22, 1996

[51] Int. Cl.⁶ .............................. G02C 5/22; G02C 5/16
[52] U.S. Cl. ...................... 351/153; 351/113; 16/228
[58] Field of Search .......................... 351/111, 113, 351/114, 119, 121, 153; 16/228

[56] References Cited

U.S. PATENT DOCUMENTS

| | | | |
|---|---|---|---|
| 384,481 | 6/1888 | Vanderwaag | 351/113 |
| 633,023 | 9/1899 | Miehle | 351/113 |
| 2,064,604 | 12/1936 | Hempel | 351/113 |
| 2,098,921 | 11/1937 | Mandaville | 351/113 |
| 2,374,649 | 5/1945 | Calkins | 351/111 |
| 2,976,766 | 3/1961 | Bianchi | 351/111 |
| 3,064,530 | 11/1962 | Vigano | 351/153 |
| 4,377,328 | 3/1983 | Ferrandi | 351/113 |
| 4,999,008 | 3/1991 | Milone | 351/113 |
| 5,018,242 | 5/1991 | Guy et al. | 16/228 |
| 5,115,540 | 5/1992 | Delorme | 351/153 |
| 5,515,575 | 5/1996 | Pinazza | 16/228 |
| 5,517,258 | 5/1996 | Naito | 351/113 |

*Primary Examiner*—Huy Mai
*Attorney, Agent, or Firm*—Thomas I. Rozsa; Tony D. Chen

[57] ABSTRACT

A double piston spring hinge which is used for connecting temples to an eyeglass frame. The double piston spring hinge has a front structure, a rear structure, two piston cylinders symmetrically and parallel mounted between the front and rear structures, a flap lever, and a bracket for stabilizing the front and rear structures. The two temples are hinged to opposite sides of the front of the frame by the double piston spring hinges so as to permit the two temples to fold on the frame. Each piston cylinder contains therein a spring. A piston goes in and out of the cylinder and is biased by the spring. The piston is held within the cylinder at one end and in linking members at the other end. The double piston spring hinges are a flexibility system which is a bracket that is a spring actuated piston piece which lends flexibility to the temple.

24 Claims, 4 Drawing Sheets

DOUBLE PISTON SPRING HINGE FOR HINGEABLY CONNECTING TEMPLES TO AN EYEGLASS FRAME

BACKGROUND OF THE INVENTION

1. Field of the Invention

The present invention generally relates to the field of spectacles. More particularly, the present invention relates to the field of double piston spring hinges for connecting temples to a spectacle frame.

2. Description of the Prior Art

Many types of hinges to connect the frame and temples of spectacles are disclosed in the prior art. These prior art hinges make it possible to spread apart the temples beyond their normal open position of use. While these hinges may function adequately, one of the disadvantages is that these prior art hinges are embedded within the temples, so that the temples must be modified to accept the hinges, which results in a costly manufacturing procedure.

The following twelve (12) prior art patents were uncovered in the pertinent field of the present invention:

1. U.S. Pat. No. 384,481 issued to Vanderwaag on Jun. 12, 1888 for "Spectacle Temple" (hereafter "the Vanderwaag Patent");
2. U.S. Pat. No. 633,023 issued to Miehle on Sep. 12, 1899 for "Spectacles" (hereafter "the Miehle Patent");
3. U.S. Pat. No. 2,064,604 issued to Hempel on Dec. 15, 1936 for "Spectacle Frame" (hereafter "the Hempel Patent");
4. U.S. Pat. No. 2,098,921 issued to Mandaville on Nov. 9, 1937 for "Spectacle Joint" (hereafter "the Mandaville Patent");
5. U.S. Pat. No. 2,374,649 issued to Calkins on May 1, 1945 for "Spectacle Bow" (hereafter "the Calkins Patent");
6. U.S. Pat. No. 2,976,766 issued to Bianchi on Mar. 28, 1961 for "Spectacle Frame Having Temples Capable Of Elastic Divarication" (hereafter "the Bianchi Patent");
7. U.S. Pat. No. 3,064,530 issued to Vigano on Nov. 20, 1962 for "Arrangement For Adjusting The Slope Of Spectacle Rims With Reference To The Sides" (hereafter "the Vigano' Patent");
8. U.S. Pat. No. 4,377,328 issued to Ferrandi on Mar. 22, 1983 for "Spectacle Frame" (hereafter "the Ferrandi Patent");
9. U.S. Pat. No. 4,999,008 issued to Milone on Mar. 12, 1991 for "Flexible Bar For Spectacles And Manufacturing Method" (hereafter "the Milone Patent");
10. U.S. Pat. No. 5,018,242 issued to Guy et al. on May 28, 1991 for "Spring-Action Hinge For Spectacle Frame" (hereafter "the Guy Patent");
11. U.S. Pat. No. 5,515,575 issued to Pinazza on May 14, 1996 for "Hinge To Connect The Legs And Frame Of A Pair Of Spectacles" (hereafter "the Pinazza Patent"); and
12. U.S. Pat. No. 5,517,258 issued to Naito on May 14, 1996 for "Eyeglass Frame With Internal Spring And Slider Assemblies" (hereafter "the Naito Patent").

The Vanderwaag Patent discloses temples of spectacles. Each spectacle-temple has a guide-piece hinged at the outer end to a clip which is secured to the lens or lens-frame. A collar is fixed on the outer end of the guide-piece and provided with an eye. An ear-wire passes through the collar and is provided on its front end with a fixed collar with an eye which slides on the guide-piece. A spring is coiled around the guide-piece between the fixed collar and the loose eye on the guide-piece. The fixed collar slides on the guide-piece to prevent undue pressure of the bow on the bridge of the nose.

The Miehle Patent discloses spectacles. It comprises two temples, wherein each has a cylindrical barrel. The barrel has a perforated end and an open end. The inner end of a longitudinal movable and rotatable bow portion projects through the perforated end of the barrel and is provided with a shoulder. A spring is around the inner end of the bow portion and located between the shoulder and the perforated end of the barrel, where the inner end of the bow portion is slidable therein such that the spring will return the bow to its original position after a limited longitudinal movement. There is also a stop collar located beyond the barrel for regulating the return movement of the bow by the spring.

The Hempel Patent discloses a spectacle frame. It comprises a main portion and a rear end portion which is bent out of alignment with the main portion. The rear end portion is adapted to be swung about an axis substantially identical with the longitudinal dimension of the main portion. A spring urges the rear end portion in a direction towards the back of the head of the wearer.

The Mandaville Patent discloses a spectacle joint. It comprises an end piece attached to a lens. A temple is hingeably connected to the end piece. The end piece has a bore and a slotted end, where the temple has a flattened end to fit in the slotted end. A hinge pin passes through the slotted end and the flattened end. The flattened end has a peripheral surface which has adjacent portions of two radii with a shoulder between them. A spring pressed plunger is situated in the bore to engage the peripheral surface.

The Calkins Patent discloses a spectacle bow. It comprises a short wire which is hinged to a lug that is attached to a frame, a spring, a temple wire which lies between the short wire and the spring, and a first pin which is attached to the spring. The spring is enclosed in a U-shaped casing. The casing is secured to the short wire, where one end of the spring is secured to the first pin. The temple wire passes through the spring and is fastened to the other end thereof. The temple wire is confined by a second pin. The temple wire is placed horizontally alongside the short wire. The relative motion of the temple wire is confined by the casing to a strictly longitudinal motion whose outward extension is opposed by the spring fastened to the pins.

The Bianchi Patent discloses a spectacle frame having temples capable of elastic divarication. The forward end of the temple has an inside face with a recess in which a hollow member is placed. The hollow member has a slot longitudinally of the temple and a chamber which communicates with the slot through a bore. The temple is hinged to the frame by a strap which is slidably fitting in the slot. The strap has a pin-like end portion which extends through the bore and into the chamber. A coil spring surrounds the strap end portion. One end of the spring abuts against the wall of the chamber and the other end of the spring abuts against a nut screwed on the threaded end of the strap end portion. The divarication of the temples is limited by the abutment of the forward end of the temples against the frame, which can be enlarged by overcoming the resistance of the springs which return the temples to a neutral position.

The Vigano Patent discloses an arrangement for adjusting the slope of spectacle rims with reference to the sides. The elements which form the hinges are connected to two temples with the body of the rims adapted to rock around an axis which lies substantially in the plane of the body of the rims while the connection allows a relative angular shifting between the body of the rims. The hinge element includes a worm and worm wheel system.

The Ferrandi Patent discloses a spectacle frame. It comprises flexible elements fitted between the parts of the front rims and of the side temples in order to make the frame itself highly adaptable to the anatomy of the face. The flexible element comprises a helical spring and two pins, one end of which engages with the spring whereas the opposite end is secured to the parts of the front rim and to the side temples.

The Milone Patent discloses a flexible bar for spectacles and manufacturing method. The spectacle is formed in two parts of relatively stiff plastic material joined together by an elastic springing element in the form of a spiral spring. The elastic element comprises a flat spring with a surface positioned on a vertical plane. The spiral spring is wound in tight coils around a central part of the flat spring and checked on opposite sides by two stop rings. The end parts of the flat spring form an anchorage into the two bar portions of the plastic material.

The Guy Patent discloses a spring-action hinge for a spectacle frame. It comprises an elastic hinge assembly which comprises a first hinge element fixed to the front part of the spectacle frame and a second hinge element integral with a rod which is inserted in the bore of a housing. The rod is pressed to the rear of the temple by a spring which presses on the one hand against a collar integral with the rod and on the other hand against a ring with a rib which engages elastically on a shoulder.

The Pinazza Patent discloses a hinge to connect the legs and frame of a pair of spectacles. The frame comprises a connecting pivot and a cam shaved element. The leg comprises at least a resilient resisting cylinder and seating. The resilient resisting cylinder includes at its forward end a surface with an inclined plane together with a lateral extension forming an abutment tooth. The cam shaved element has two surfaces formed as inclined planes at an angle to each other and at an angle to the plane which contains the lengthwise axis of sliding of the cylinder.

The Naito Patent discloses an eyeglass frame with internal spring and slider assemblies. It comprises hinge assemblies, wherein each assembly is fixed to the joint piece of either side of the frame. It comprises an engagement piece which has an axle transverse in its recess end, a hollow sheath which has a lever pivotally fixed to its open end, and a spring-biased slider contained therein. The slider has a hook end. The engagement piece is fixed to the joint piece, and the sheath is fixed to the temple. The temple is connected to the front by inserting the hook of the slider in the recess of the engagement piece, and then the temple is pulled to the engagement piece by the resilient force, which is applied to the slider.

Therefore, there remains a need for a very efficient and also very effective design and construction of an external hinge assembly to provide optimum flexibility and movement of the temples beyond their normal open position of use, where the hinge assembly also provides a spring back to firmly secure the temples to the face of a user.

SUMMARY OF THE INVENTION

The present invention is a double piston spring hinge for connecting temples to an eyeglass frame. The double piston spring hinge comprises a front structure, a rear structure, two piston cylinders symmetrically and parallel mounted between the front and rear structures, a flap lever, and a bracket for stabilizing the front and rear structures.

The two temples are hinged to opposite sides of the front of the frame so as to permit the two temples to fold on the frame. Where the rims are not continuous, they are separated at a location where both ends of the rim are attached to the double piston spring hinge. In other words, one end of the rim is affixed to the double piston spring hinge, while the other end is threadedly engaged with the double piston spring hinge, thereby forming the rim to retain a lens.

Specifically, each piston cylinder contains therein spring means. A piston is slidable within a cylinder and is biased by the spring means. The piston is held within the cylinder at one end and in linking members at the other end.

The double piston spring hinge is a flexibility system which is a bracket that is a spring actuated piston piece which lends flexibility to the temple.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is a double piston spring hinge for connecting temples to a conventional eyeglass or sunglass frame. The eyeglass frame may comprise either a dual lens assembly or a unitary lens assembly. The dual lens assemblies are well known in the art of prescription glasses and sunglasses, and include a separate right lens and left lens held in place in front of the range of vision of the wearer's right and the frame by the frame.

It will be appreciated that the present invention is not limited to the conventional dual lens assembly. It is emphasized that while the dual lens assembly is preferred with the present invention double piston spring hinges, it is also within the spirit and scope of the present invention to utilize the double piston spring hinges with a unitary lens assembly which utilize a single lens placed in a unitary frame. The term eyeglass is used only as a descriptive term for describing the illustrated embodiment, and not as a limitation on the scope of the present invention.

Figure 1:
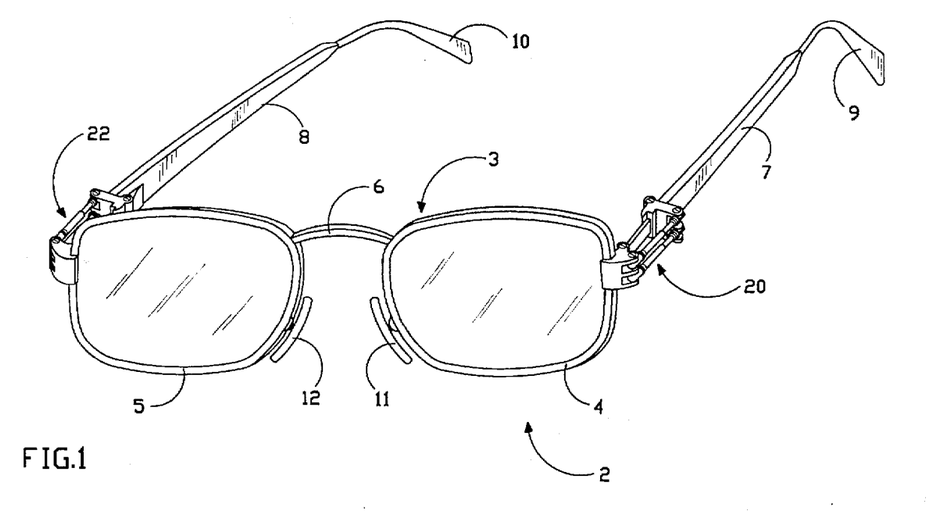
FIG. 1 is a perspective view of the present invention double piston spring hinges attached between the temples and the eyeglass frame.

Referring to FIG. 1, there is shown a conventional eyeglass system 2 used in conjunction with the present invention double piston spring hinges 20 and 22. The eyeglass system 2 comprises a conventional frame 3 which has conventional components, including two opposite rims 4 and 5 connected by a bridge 6 for holding the lenses, two opposite temples 7 and 8 connected to the frame 3 by the present invention double piston spring hinges 20 and 22, earpieces 9 and 10 for engaging the ears of a user, and nose supports 11 and 12. The two temples 7 and 8 are hinged to opposite sides of the front of the frame 3 so as to permit the two temples 7 and 8 to fold on the frame 3. The rims 4 and 5 are not continuous. Now referring to FIG. 11, the rims 4 and 5 are separated at a location 13 where one end is permanently affixed to the double piston spring hinge and the other end is threadedly secured to the double piston spring hinge. The rims 4 and 5 can be separated at location 13 so that lenses can be installed thereto.

Figure 2:
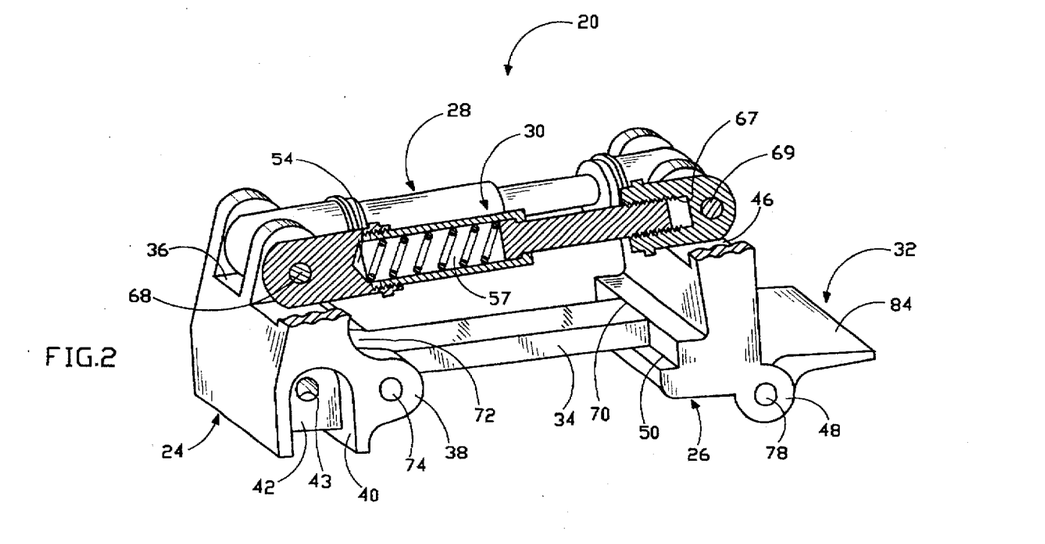
FIG. 2 is a partial cut away perspective view of one of the two double piston spring hinges, with one of the two piston cylinder assemblies shown in a cross-sectional view.

Since both double piston spring hinges 20, 22 and both temples 7, 8 are preferably mirror images, respectively, reference will be made to only one double piston spring hinge 20, and one temple 7 herein. Referring to FIG. 2, there is shown a perspective view of the double piston spring hinge 20 which comprises a front support structure 24, a rear support structure 26, two piston cylinder assemblies 28 and 30 symmetrically and parallel mounted between the front and rear support structures 24 and 26, a flap lever member 32, and a stabilizing bracket 34 for stabilizing the front and rear support structures 24 and 26.

Figure 3:
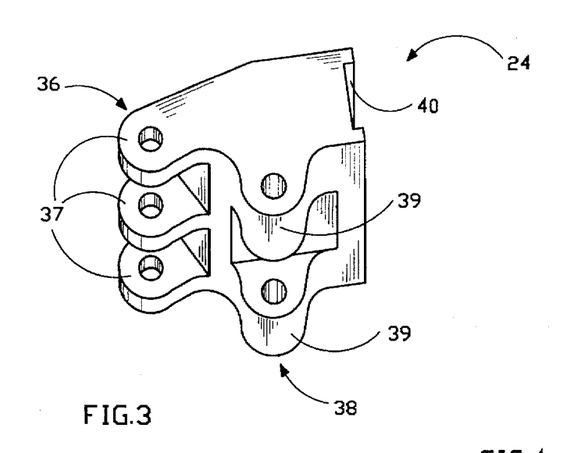
FIG. 3 is a perspective view of the front support structure of the present invention double piston spring hinge, showing the support extensions.
Figure 4:
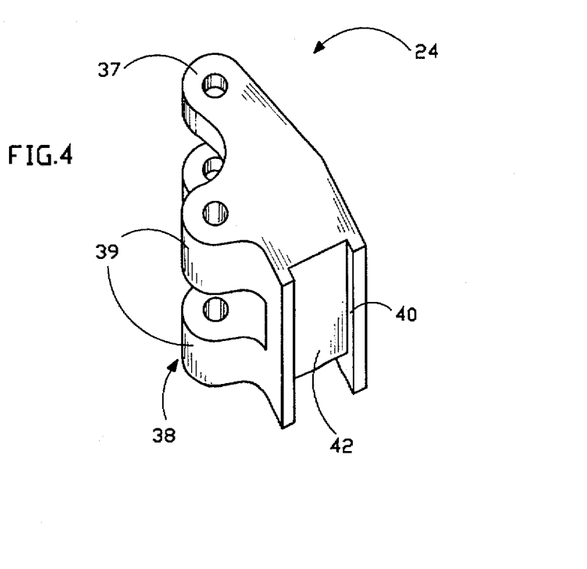
FIG. 4 is a perspective view of the front support structure of the present invention double piston spring hinge, showing the transverse groove for receiving a part of the rim of the frame.

Referring to FIGS. 2, 3 and 4, there is shown the front support structure 24 which has a transverse forward attachment portion 36, a transverse medial attachment portion 38, and a transverse groove 40 for accommodating part of the rim 4. The forward attachment portion 36 has three equally spaced apart support extensions 37, while the medial attachment portion 38 has only two spaced apart support extensions 39. Each support extension of the forward and medial attachment portions 36 and 38 has an aperture therethrough. A step section 42 is provided within the transverse groove 40 and has a threaded aperture 43, where the lower protruding flange end 13 (see FIGS. 10 and 11) of the rim 4 is positioned within the lower part of the transverse groove 40 and aligned with the threaded aperture 43 to be secured thereto by a screw 44. This provides a means for separating the rim 4 apart so that a lens may be removed and replaced or vice versa. The upper end of the rim 4 is permanently affixed within the transverse groove 40 of the front support structure 24 by welding, soldering or adhesive means and abuts against the step section 42.

Figure 5:
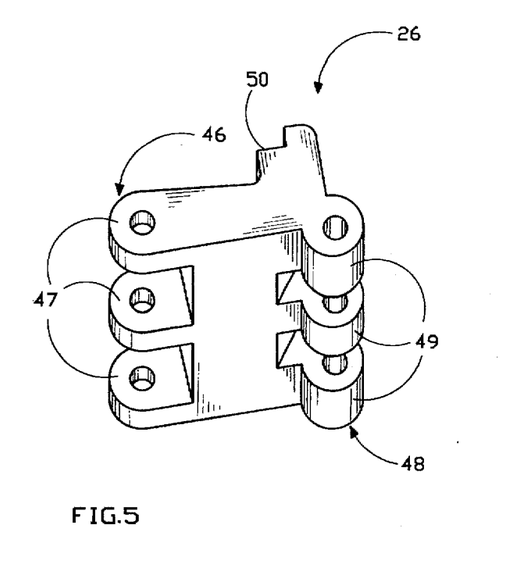
FIG. 5 is a perspective view of the rear support structure of the present invention double piston spring hinge, showing the support extensions.

Referring to FIGS. 2 and 5, there is shown the rear support structure 26 which has a transverse forward attachment portion 46, a transverse rearward attachment portion 48 located remote from the forward attachment portion 46, and a step-down portion 50 located opposite the rearward attachment portion 48. The forward attachment portion 46 has three equally spaced apart support extensions 47, while the rearward attachment portion 48 also has three equally spaced apart support extensions 49. Each support extension of the front and rearward attachment portions 46 and 48 has an aperture therethrough.

Figures 7, 11:
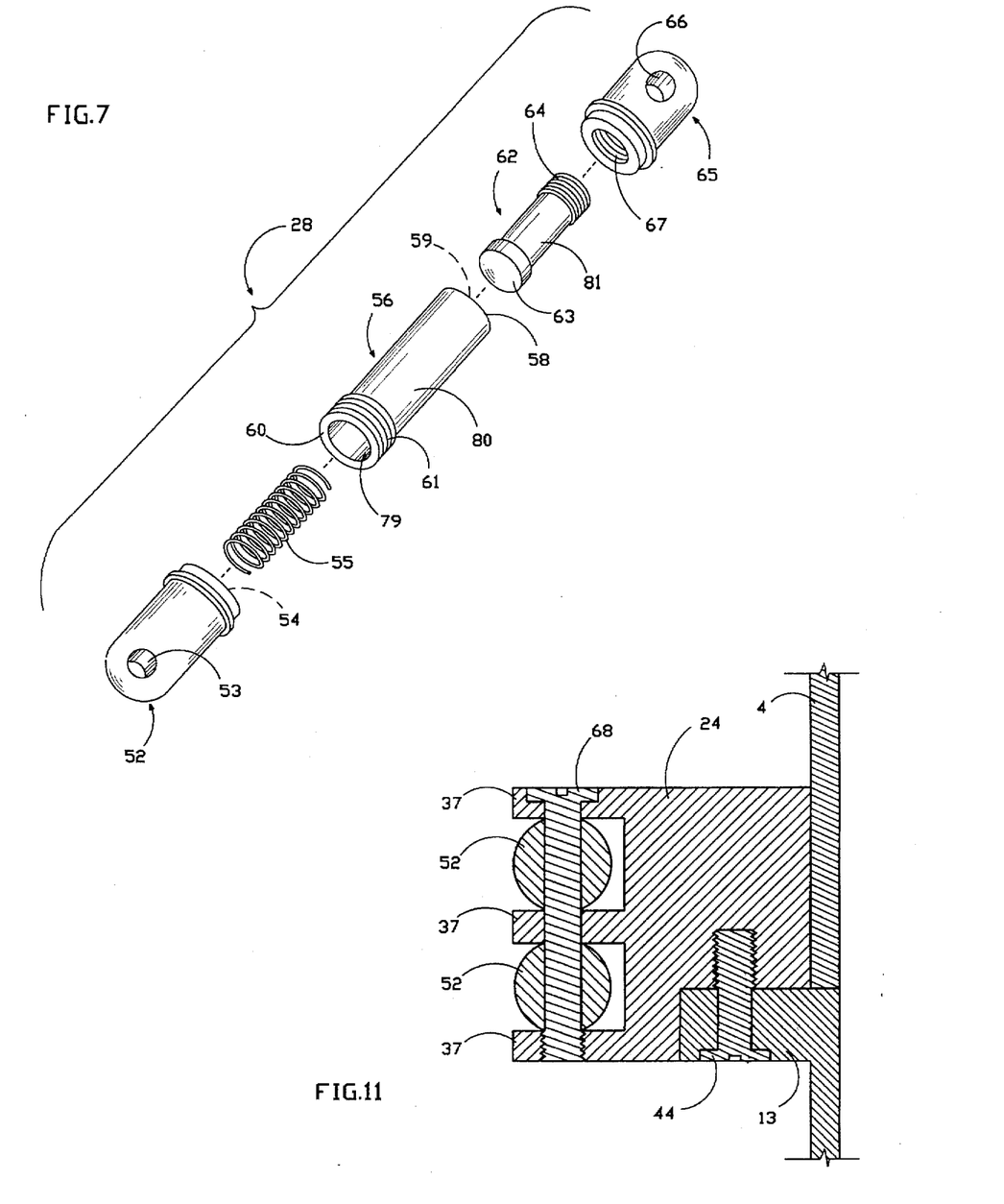
FIG. 7 is an exploded view of one of the piston cylinder assemblies of the present invention double piston spring hinge.
FIG. 11 is an enlarged cross-sectional view taken along line 11—11 of FIG. 9.

Referring to FIGS. 2 and 7, there is shown two piston cylinder assemblies 28 and 30 installed on the double piston spring hinge 20. Each of the piston cylinder assemblies 28 and 30 are substantially identical, and to the extent they are, only one piston cylinder assembly 28 will be described in detail. The piston cylinder assembly 28 has a proximal Linking member 52, spring means 55, a piston cylinder 56, a piston rod 62, and a distal linking member 65. The proximal and distal linking members 52 and 65 have transverse openings 53 and 66 extending therethrough and opening ends with internal screw threads 54 and 67 respectively. The piston cylinder 56 has a closed end 58 with a narrow opening 59, an opposite end 60 with a wide opening 79, an interior chamber 57 extending from the narrow opening 59 to the wide opening 79, a circumferential sidewall 80, and external screw threads 61 located on the sidewall 80 and adjacent to the opposite end 60. The piston rod 62 has a piston end 63, a rod portion 81 and external screw threads 64 located on the rod portion 81 and remote from the piston end 63. The piston cylinder assembly 28 is assembled by slidably installing the piston rod 62 inside the interior chamber 57 of the piston cylinder 56 from the wide opening 79 at the opposite end 60 of the cylinder 56, where the rod portion 81 extends out from the narrow opening 59 of the closed end 58 of the cylinder 56. The external screw threads 64 of the piston rod 62 are threadedly engaged with the internal screw threads 67 of the distal linking member 65. The spring means 55 is then installed within the interior chamber 57 of the cylinder 56 such that the spring means 55 is biasing the piston end 63 of the piston rod 62. The external screw threads 61 of the cylinder 56 is then threadedly engaged with the internal screw threads 54 of the proximal linking member 52 to connect the opposite end 60 of the piston cylinder 56 to the proximal linking member 52, where the spring means 55 is retained within the interior chamber 57 of the cylinder 56. The proximal and distal linking members 52 and 65 are then hingeably connected between the support extensions 37 and 47 of the forward attachment portions 36 and 46 of the front and rear support structures 24 and 26 respectively by screws 68 and 69, where the forward attachment portion 36 of the front support structure 24 is substantially aligned with the forward attachment portion 46 of the rear support structure 26.

The support bracket 34 has one end 70 fixed to the step-down portion 50 of the rear support structure 26 by soldering, welding or adhesive means and the other end 72 is hingeably connected between the support extensions 39 of the medial attachment portion 38 of the front support structure 24 by a screw 74.

Figure 6:
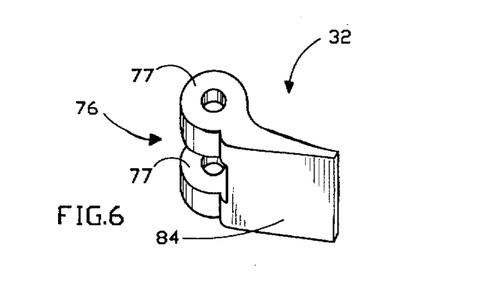
FIG. 6 is a perspective view of the flap lever member of the present invention double piston spring hinge.

Referring to FIGS. 2 and 6, there is shown the flap lever member 32 of the present invention double piston spring hinge 20. The flap lever member 32 has a transverse attachment end 76 with two spaced apart support extensions 77 which are aligned with and hingeably connected between the support extensions 49 of the rearward attachment portion 48 of the rear support structure 26 by a screw 78. The flap lever member 32 also has a flat side 84 which is permanently affixed to the temple 7 (see FIGS. 8, 9 and 10).

Figure 8:
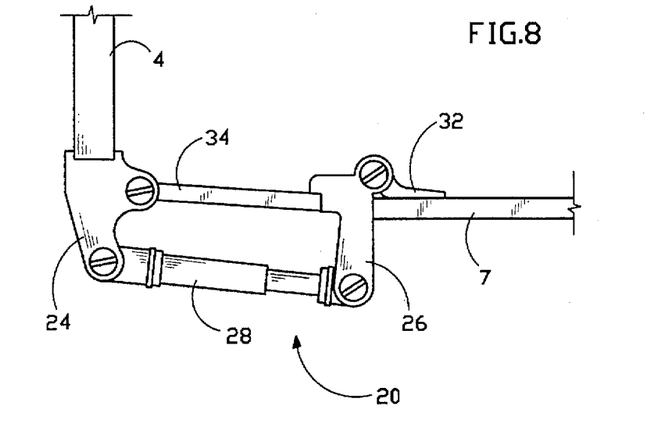
FIG. 8 is a partial top plan view of the present invention double piston spring hinge, showing the temple in its extended condition and the piston cylinder assembly in its uncompressed mode.
Figure 9:
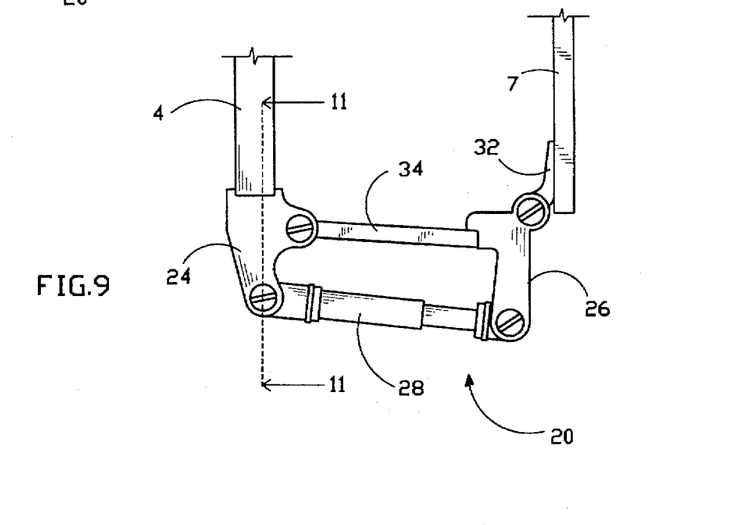
FIG. 9 is a partial top plan view of the present invention double piston spring hinge, showing the temple in its folded condition.
Figure 10:
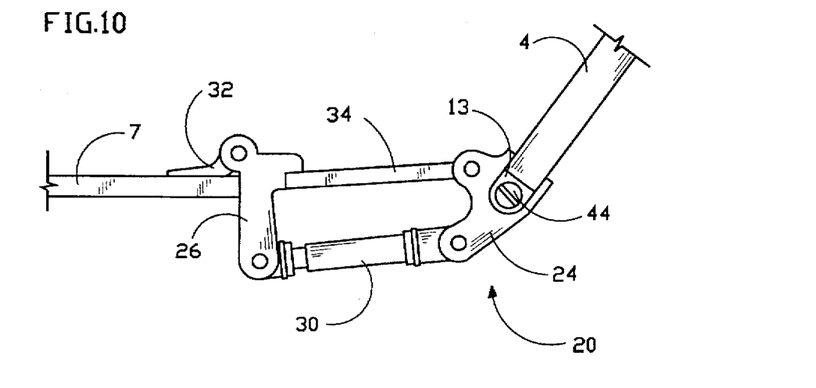
FIG. 10 is a partial bottom plan view of the present invention double piston spring hinge, showing the temple in its extended condition and the piston cylinder assembly in its compressed mode.

FIGS. 8, 9 and 10 illustrate how the present invention double spring hinge 20 functions. As seen in FIG. 8, the temple 7 is opened to be in alignment with the flap lever member 32, such that the piston cylinder assembly 30 is not in its compressed mode. As seen in FIG. 9, the temple 7 is folded on the front, where the temple 7 is parallel to the front of the frame and the piston cylinder assembly 30 is also not in its compressed mode. As seen in FIG. 10, the temple 7 is opened to be in alignment with the flap lever member 32, such that the piston cylinder assembly 30 is in its compressed mode. The double piston spring hinges 20 and 22 provide flexibility and movement of the temples 7 and 8 beyond their normal open position of use, such that the piston cylinder assemblies 28 and 30 provide a spring back to firmly secure the temples 7 and 8 to the face of a user.

The present invention conforms to conventional forms of manufacture or any other conventional way known to one skilled in the art. By way of example, the double piston spring hinges 20 and 22 can be made of metal material or any suitable material known in the art.

It will be appreciated that the present invention is not limited to the two piston cylinder assemblies 28 and 30 illustrated in the figures. It is emphasized that while the two piston cylinder assemblies are the preferred embodiment, it is also within the spirit and scope of the present invention to manufacture the double piston spring hinges 20 and 22 with only one piston cylinder assembly instead of two piston cylinder assemblies.

Defined in detail, the present invention is a pair of double piston spring hinges for respectively hingeably connecting two opposite temples to an eyeglass frame, each double piston spring hinge comprising: (a) a flap lever member having a side surface being permanently affixed to one end of one of the two opposite temples and a transverse attachment end; (b) a rear support structure having a transverse rearward attachment portion, a step-down portion located on an opposite side from the rearward attachment portion and a transverse forward attachment portion located remote from the rearward attachment portion, the rearward attachment portion hingeably connected to the transverse attachment end of the flap lever member; (c) a front support structure being permanently affixed to the front of the frame and having a transverse medial attachment portion, and a transverse forward attachment portion aligned with the forward attachment portion of the rear support structure; (d) a pair of piston cylinder assemblies, each assembly having a proximal linking member, a distal linking member, spring means, a piston cylinder, and a piston rod; (e) each the distal and proximal linking members having a transverse opening and an opened end with internal screw threads; (f) the each piston cylinder having a closed end with a narrow opening, an opened end with a wide opening, a circumferential sidewall with external screw threads located adjacent to the opened end and an interior chamber extending from the narrow opening to the wide opening, the external screw threads of each respective circumferential sidewall threadedly engaged with the internal screw threads of the each respective opened end of the each respective proximal linking member; (g) the each respective piston rod having a piston end slidable inside the each respective interior chamber of the each respective piston cylinder and a rod portion with external screw threads extending out from the each respective narrow opening of the each respective closed end of the each respective piston cylinder, the external screw threads of the rod portion threadedly engaged with the each respective internal screw threads of the each respective opened end of the each respective distal linking member; (h) the each respective spring means installed inside the each respective interior chamber of the each respective piston cylinder and biasing the each respective piston rod away from the each respective wide opening of the each respective opened end of the each respective piston cylinder; (i) the transverse openings of each the respective proximal and distal linking members hingeably connected to the respective forward attachment portions of the front and rear support structures, where the pair of piston cylinder assemblies are symmetrically and parallel mounted between the front and rear support structures; and (j) a bracket for stabilizing the front and rear support structures and having one end permanently affixed to the step-down portion of the rear support structure and the other end hingeably connected to the medial attachment portion of the front support structure; (k) whereby the pair of piston cylinder assemblies provide flexibility and movement of the pair of temples beyond their normal open position of use, such that the pair of piston cylinder assemblies provide a spring back to firmly secure the two temples to the face of a user.

Defined broadly, the present invention is a pair of piston spring hinges for respectively hingeably connecting two opposite temples to a spectacle frame, each piston spring hinge comprising: (a) a rear support structure having a rearward attachment portion, a support portion and a forward attachment portion, the rearward attachment portion being hingeably connected to one end of one of the two opposite temples; (b) a front support structure attached to the front of the frame and having a medial attachment portion, and a forward attachment portion aligned with the forward attachment portion of the rear support structure; (c) at least two piston cylinder assemblies, each assembly having a proximal linking member with an opening, a distal linking member with an opening biasing means, a piston cylinder and a piston rod; (d) the each respective piston cylinder having one end with a narrow opening, an opposite end with a wide opening, and an interior chamber extending from the narrow opening to the wide opening, the opposite end press-fitted within the opening of the proximal linking member; (e) the each respective piston rod having a piston end slidable inside the respective interior chamber of the each respective piston cylinder and a rod portion extending out from the each respective narrow opening of the each one end of the each respective piston cylinder, the rod portion press-fitted within the each respective opening of the each respective distal linking member; (f) the each respective biasing means biasing the each respective piston rod away from the each respective wide opening of the each respective opposite end of the each respective piston cylinder; and (g) each the respective proximal and distal linking members hingeably connected to the respective forward attachment portions of the respective front and rear support structures, where the at least two piston cylinder assemblies are symmetrically and parallel mounted between the front and rear support structures; (h) whereby the at least two piston cylinder assemblies provide flexibility and movement of the two opposite temples beyond their normal open position of use, such that the at least two piston cylinder assemblies provide a spring back to firmly secure the two temples to the face of a user.

Defined more broadly, the present invention is a pair of piston spring hinges for respectively hingeably connecting two temples to a spectacle frame, each piston spring hinge comprising: (a) a rear structure having a rearward portion being connected to one end of one of the two temples and a forward portion; (b) a front structure attached to the front of the frame and having a forward portion; and (c) at least one piston cylinder assembly having a proximal member, a distal member, a cylinder connected to the proximal member, a piston rod slidably installed within the cylinder and connected to the distal member, and means for biasing the piston rod away from the proximal member, the proximal and distal members respectively hingeably connected to the forward portions of the front and rear structures; (d) whereby the at least one piston cylinder assembly provides flexibility and movement of the two temples beyond their normal open position of use, such that the at least one piston cylinder assembly provides a spring back to firmly secure the two temples to the face of a user.

Defined even more broadly, the present invention is a piston spring hinge for a spectacle frame, for hingeably connecting a temple to the spectacle frame, the piston spring hinge comprising: (a) a rear structure having a rearward portion being hingeably connected to one end of the temple, and a forward portion; (b) a front structure attached to the front of the frame and having a forward portion; and (c) at least one piston cylinder assembly having a cylinder, a piston rod slidably installed inside the cylinder, and means for biasing the piston rod, where the cylinder and the rod are hingeably connected to the forward portions of the front and rear structures respectively; (d) whereby the at least one piston cylinder assembly provides flexibility and movement of the temple beyond its normal open position of use, such that the at least one piston cylinder assembly provides a spring back to firmly secure the temple to the face of a user.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A pair of double piston spring hinges for respectively hingeably connecting two opposite temples to an eyeglass frame, each double piston spring hinge comprising:

a. a flap lever member having a side surface being permanently affixed to one end of one of said two opposite temples and a transverse attachment end;

b. a rear support structure having a transverse rearward attachment portion, a step-down portion located on an opposite side from the rearward attachment portion and a transverse forward attachment portion located remote from the rearward attachment portion, the rearward attachment portion hingeably connected to said transverse attachment end of said flap lever member;

c. a front support structure being permanently affixed to the front of the frame and having a transverse medial attachment portion, and a transverse forward attachment portion aligned with said forward attachment portion of said rear support structure;

d. a pair of piston cylinder assemblies, each assembly having a proximal linking member, a distal linking member, spring means, a piston cylinder, and a piston rod;

e. each said distal and proximal linking members having a transverse opening and an opened end with internal screw threads;

f. said each piston cylinder having a closed end with a narrow opening, an opened end with a wide opening, a circumferential sidewall with external screw threads located adjacent to the opened end and an interior chamber extending from the narrow opening to the wide opening, the external screw threads of each respective circumferential sidewall threadedly engaged with said internal screw threads of said each respective opened end of said each respective proximal linking member;

g. said each respective piston rod having a piston end slidable inside said each respective interior chamber of said each respective piston cylinder and a rod portion with external screw threads extending out from said each respective narrow opening of said each respective closed end of said each respective piston cylinder, the external screw threads of the rod portion threadedly engaged with said each respective internal screw threads of said each respective opened end of said each respective distal linking member;

h. said each respective spring means installed inside said each respective interior chamber of said each respective piston cylinder and biasing said each respective piston rod away from said each respective wide opening of said each respective opened end of said each respective piston cylinder;

i. said transverse openings of each said respective proximal and distal linking members hingeably connected to said respective forward attachment portions of said front and rear support structures, where said pair of piston cylinder assemblies are symmetrically and parallel mounted between said front and rear support structures; and j. a bracket for stabilizing said front and rear support structures and having one end permanently affixed to said step-down portion of said rear support structure and the other end hingeably connected to said medial attachment portion of said front support structure;

k. whereby said pair of piston cylinder assemblies provide flexibility and movement of said pair of temples beyond their normal open position of use, such that said pair of piston cylinder assemblies provide a spring back to firmly secure said two temples to the face of a user.

2. A pair of piston spring hinges for respectively hingeably connecting two opposite temples to a spectacle frame, each piston spring hinge comprising:

a. a rear support structure having a rearward attachment portion, a support portion and a forward attachment portion, the rearward attachment portion being hingeably connected to one end of one of said two opposite temples;

b. a front support structure attached to the front of the frame and having a medial attachment portion, and a forward attachment portion aligned with said forward attachment portion of said rear support structure;

c. at least two piston cylinder assemblies, each assembly having a proximal linking member with an opening, a distal linking member with an opening, biasing means, a piston cylinder and a piston rod;

d. said each respective piston cylinder having one end with a narrow opening, an opposite end with a wide opening, and an interior chamber extending from the narrow opening to the wide opening, the opposite end press-fitted within said opening of said proximal linking member;

e. said each respective piston rod having a piston end slidable inside said each respective interior chamber of said each respective piston cylinder and a rod portion extending out from said each respective narrow opening of said each one end of said each respective piston cylinder, the rod portion press-fitted within said each respective opening of said each respective distal linking member;

f. said each respective biasing means biasing said each respective piston rod away from said each respective wide opening of said each respective opposite end of said each respective piston cylinder; and g. each said respective proximal and distal linking members hingeably connected to said respective forward attachment portions of said respective front and rear support structures, where said at least two piston cylinder assemblies are symmetrically and parallel mounted between said front and rear support structures;

h. whereby said at least two piston cylinder assemblies provide flexibility and movement of said two opposite temples beyond their normal open position of use, such that said at least two piston cylinder assemblies provide a spring back to firmly secure said two temples to the face of a user.

3. The pair of piston spring hinges in accordance with claim 2 wherein said each respective piston spring hinge further comprises a flap lever member having a side surface being permanently affixed said one end of one of said two opposite temples and a transverse attachment end hingeably connected to said rearward attachment portion of said rear support structure.

4. The pair of piston spring hinges in accordance with claim 2 wherein said each respective biasing means includes a spring.

5. The pair of piston spring hinges in accordance with claim 2 wherein said each respective piston spring hinge further comprises a bracket for stabilizing said front and rear support structures and having one respective end permanently affixed to said respective support portion of said respective rear support structure and the respective other end hingeably connected to said respective medial attachment portion of said respective front support structure.

6. The pair of piston spring hinges in accordance with claim 2 wherein each said respective distal and proximal linking members further comprise a transverse opening for allowing a screw to be inserted therethrough to secure each said respective distal and proximal linking members to said respective forward attachment portions of said respective front and rear support structures.

7. A pair of piston spring hinges for respectively hingeably connecting two temples to a spectacle frame, each piston spring hinge comprising:

a. a rear structure having a rearward portion being connected to one end of one of said two temples and a forward portion;

b. a front structure attached to the front of the frame and having a forward portion; and c. at least one piston cylinder assembly having a proximal member, a distal member, a cylinder connected to the proximal member, a piston rod slidably installed within the cylinder and connected to the distal member, and means for biasing the piston rod away from the proximal member, the proximal and distal members respectively hingeably connected to said forward portions of said front and rear structures;

d. whereby said at least one piston cylinder assembly provides flexibility and movement of said two temples beyond their normal open position of use, such that said at least one piston cylinder assembly provides a spring back to firmly secure said two temples to the face of a user.

8. The piston spring hinges in accordance with claim 7 wherein said each piston spring hinge further comprises a flap lever being permanently affixed said one end of one of said two temples and an attachment end hingeably connected to said rearward portion of said rear structure.

9. The piston spring hinges in accordance with claim 7 wherein said means for biasing includes a spring.

10. The piston spring hinges in accordance with claim 7 wherein said each piston spring hinge further comprises a bracket for stabilizing said front and rear support structures.

11. The piston spring hinges in accordance with claim 7 wherein each said distal and proximal members further comprise a transverse opening for allowing a screw to be inserted therethrough to secure each said distal and proximal members to said forward portions of said front and rear structures respectively.

12. The piston spring hinges in accordance with claim 7 wherein said each respective cylinder is connected to said each respective proximal member by press-fit.

13. The piston spring hinges in accordance with claim 7 wherein said each respective piston rod is connected to said each respective distal member by press-fit.

14. The piston spring hinges in accordance with claim 7 wherein said each respective cylinder is connected to said each respective proximal member by threaded screw means.

15. The piston spring hinges in accordance with claim 7 wherein said each respective piston rod is connected to said each respective distal member by threaded screw means.

16. A piston spring hinge for a spectacle frame, for hingeably connecting a temple to the spectacle frame, the piston spring hinge comprising:

a. a rear structure having a rearward portion being hingeably connected to one end of the temple, and a forward portion;

b. a front structure attached to the front of the frame and having a forward portion; and c. at least one piston cylinder assembly having a cylinder, a piston rod slidably installed inside the cylinder, and means for biasing the piston rod, where the cylinder and the rod are hingeably connected to said forward portions of said front and rear structures respectively;

d. whereby said at least one piston cylinder assembly provides flexibility and movement of said temple beyond its normal open position of use, such that said at least one piston cylinder assembly provides a spring back to firmly secure said temple to the face of a user.

17. The piston spring hinge in accordance with claim 16 further comprising a flap lever being permanently affixed said one end of said temple and an attachment end hingeably connected to said rearward portion of said rear structure.

18. The piston spring hinge in accordance with claim 16 wherein said means for biasing includes a spring.

19. The piston spring hinge in accordance with claim 16 further comprising a bracket for stabilizing said front and rear support structures.

20. The piston spring hinge in accordance with claim 16 further comprising distal and proximal members, each having a transverse opening for allowing a screw to be inserted therethrough to respectively secure the distal and proximal members to said respective forward portions of said front and rear structures.

21. The piston spring hinge in accordance with claim 20 wherein said cylinder is connected to said proximal member by press-fit.

22. The piston spring hinge in accordance with claim 20 wherein said piston rod is connected to said distal member by press-fit.

23. The piston spring hinge in accordance with claim 20 wherein said cylinder is connected to said proximal member by threaded screw means.

24. The piston spring hinge in accordance with claim 20 wherein said piston rod is connected to said distal member by threaded screw means.

* * * * *